J. W. FORREST.
SAW SET AND JOINTER.
APPLICATION FILED FEB. 17, 1909.
972,354.
Patented Oct. 11, 1910.
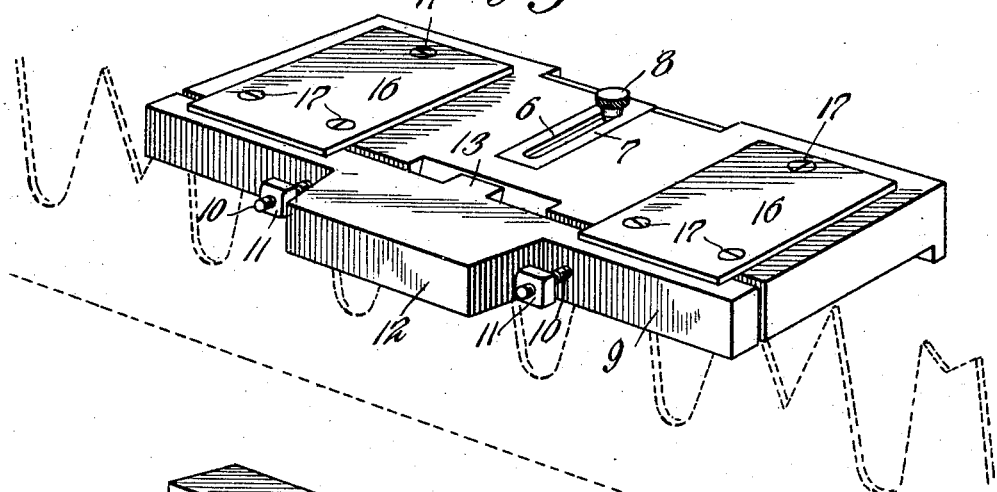
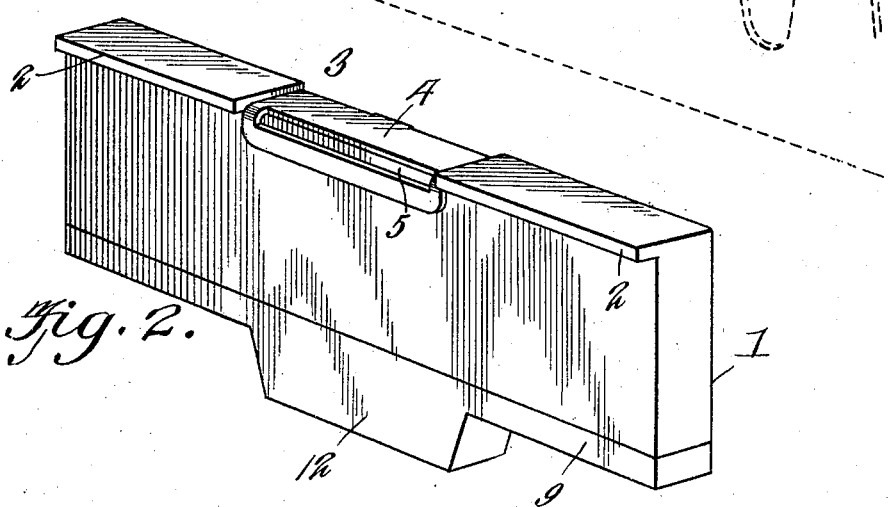
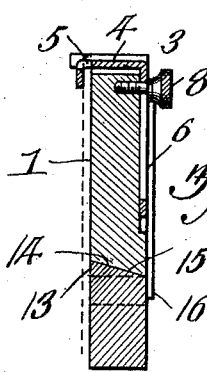
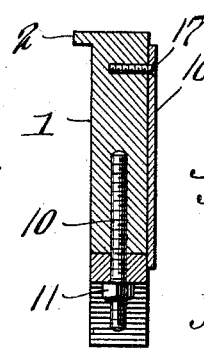
Witnesses
Frank B. Hoffman
P. M. Smith
Inventor
John W. Forrest
By Victor J. Evans
Attorney

UNITED STATES PATENT OFFICE.

JOHN W. FORREST, OF BLYTHEVILLE, ARKANSAS.

SAW SET AND JOINTER.

972,354.   Specification of Letters Patent.   Patented Oct. 11, 1910.

Application filed February 17, 1909. Serial No. 478,364.

*To all whom it may concern:*

Be it known that I, JOHN W. FORREST, a citizen of the United States, residing at Blytheville, in the county of Mississippi and State of Arkansas, have invented new and useful Improvements in Saw Sets and Jointers, of which the following is a specification.

This invention relates to saw sets and jointers, the object of the invention being to provide a simple and reliable device to facilitate the swaging or setting and jointing of cross cut saws.

The construction of the device hereinafter described is such that each and every tooth of any cross cut saw may be accurately set either before or after filing. Furthermore, any desired degree of pitch may be imparted to the saw teeth according to the work to be performed by the saw.

With the above and other objects in view, the nature of which will more fully appear as the description proceeds, the invention consists in the novel construction, combination and arrangement of parts as herein fully described, illustrated and claimed.

In the accompanying drawings:—Figure 1 is a perspective view of a saw set and jointing device constructed in accordance with the present invention. Fig. 2 is a similar view taken from a different position. Fig. 3 is a cross section taken in line with the shank of the adjustable jointing gage. Fig. 4 is a cross section taken in line with one of the swage bar guides.

1 designates the frame or body of the device which is shown for convenience in the form of a rectangular or oblong block provided along one edge with flanges 2 which extend to one side of the frame and are set perpendicularly to such side, a central space 3 being left between the flanged portion of the frame to provide a recess in which is arranged a jointing gage plate 4, the same being provided with a slot 5 through which the saw teeth are adapted to project to enable the same to be filed off down to the plane of the outer surface of the gage plate while the adjacent teeth at each side thereof rest against the bottom of the flanges 2, thus enabling all of the teeth of the saw to be accurately filed or jointed either before or after the swaging operation.

In order to render the gage plate 4 adjustable, said plate is provided at one side with a slotted shank 6 which is led into a corresponding recess 7 in one side of the frame or body 1 as shown in Figs. 1 and 3, said shank receiving through the slot thereof, a binding screw 8 which is threaded into the frame or block 1 and adapted to clamp the shank 6 and securely hold the gage plate 4 at any point of adjustment.

Extending along one edge of the body or frame 1 is a swage bar 9 having openings to receive a pair of swage bar guides 10 in the form of bolts or pins extending laterally from one edge of the frame 1 as shown in Figs. 1 and 4, said guides being threaded to receive nuts 11 for limiting the outward movement of the swage bar 9 relatively to the frame 1. Centrally the swage bar 9 is provided with an oppositely extending impact head 12 adapted to be struck by a hammer or mallet or similar implement in the operation of swaging the teeth of the saw. On its inner edge the swage bar 9 is provided with an inwardly extending swage lug 13 having an inclined face 14 as shown in Fig. 3, while the adjacent portion of the edge of the frame 1 is correspondingly beveled or inclined as shown at 15 whereby the inclined face of the swage lug is adapted to deflect the saw tooth laterally and impart the necessary pitch thereto.

In order to provide for swaging the teeth to a greater or lesser degree or in other words, regulating the lateral pitch of the teeth, adjustable swaging gages 16 in the form of plates as shown in Fig. 1 are secured to one side of the frame or body 1 by means of screws 17 so that by loosening said screws, any desired distance may be left between the inner surfaces of said plates and the adjacent face of the frame or body 1. It will be understood that in the swaging operation, the teeth of the saw are introduced between the swage bar 9 and the frame or body 1 as indicated by dotted lines in Fig. 1 so that the extremities of certain teeth will bear against the inner faces of the plates 16. Therefore, by adjusting said plates toward and away from the body or frame 1, the tooth to be swaged is allowed to project more or less into the swaging space and the swaging lug is adapted to act on the tooth at a greater or lesser distance from the point thereof. This provides for imparting more or less lateral pitch to the tooth when the swage bar is struck on the impact head 12.

From the foregoing description it will be understood that the device is adapted to be operated entirely by hand and by a single operator, the saw being held by any larger clamp or rack, the device hereinabove described being held in proper relation to the teeth of the file with the aid of one hand while the other hand is left free to manipulate the hammer.

I claim:—

A device of the class described, comprising a body having spaced faces disposed in a common plane and an intermediate face arranged at an inclination to the plane of the first mentioned faces, a swage bar extending along one edge of the body and having spaced faces disposed in a common plane and opposite to and parallel with the first mentioned faces of the body and bar to receive saw teeth between the same and bar, a lug projecting from the inner face of the bar and inclined parallel to the said intermediate face of the body for setting teeth of the saw, members projecting laterally from the body across the saw receiving space between the latter and bar and extending through the bar, and adjustable stops on the outer ends of the members for limiting the outward movement of the bar, said members forming sole supporting means for the bar and forming guides on which the bar moves back and forth in the swaging operation.

In testimony whereof I affix my signature in presence of two witnesses.

JOHN W. FORREST.

Witnesses:
M. ABBOTT,
CHAS. L. BRIDGES.